Dec. 19, 1922.
C. R. MENNILLO.
SECURING DEVICE FOR AUTOMOBILE SPARE WHEELS.
FILED MAY 18, 1922.
1,439,115.
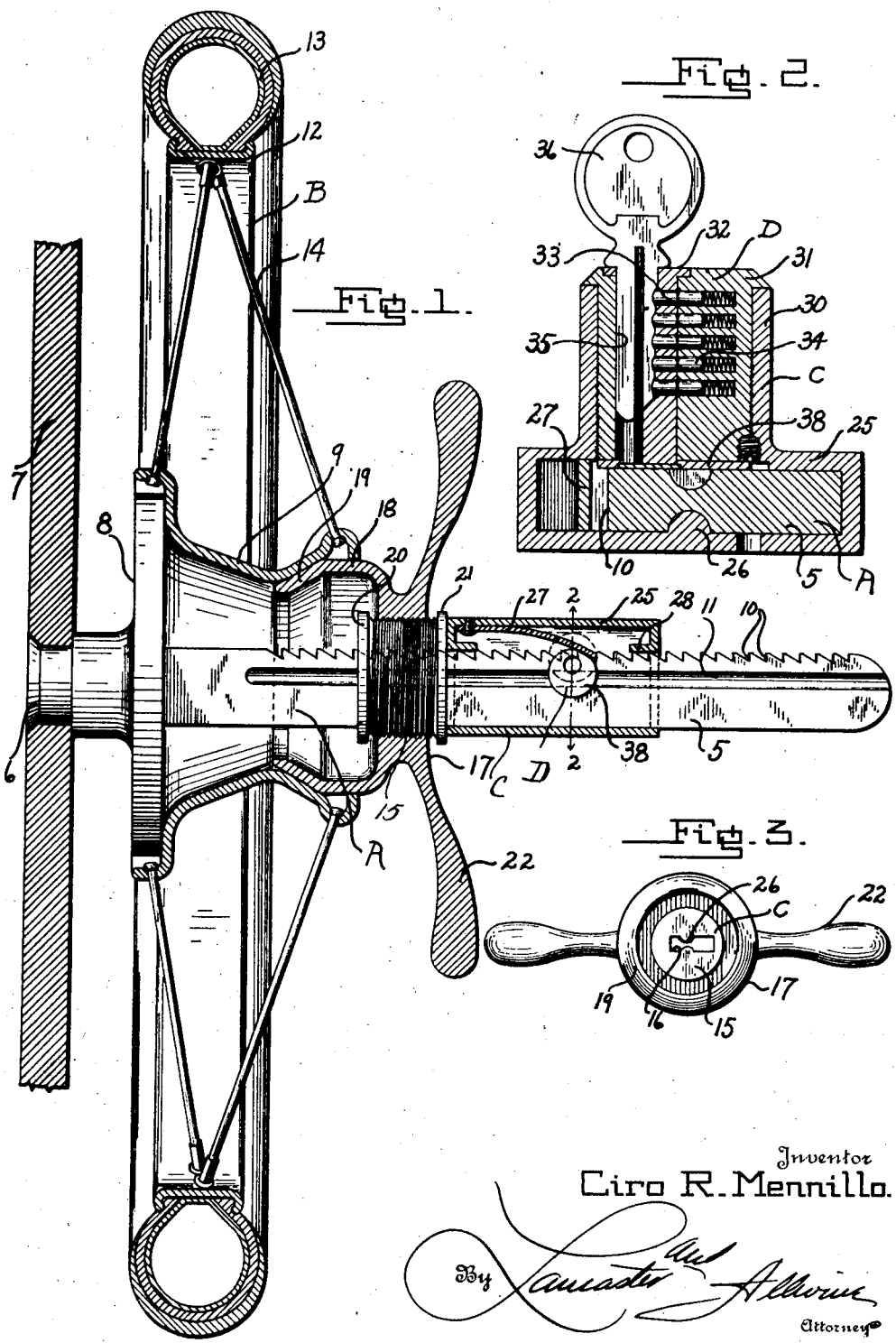
Inventor
Ciro R. Mennillo.
By Lancaster and Allwine
Attorney Patented Dec. 19, 1922.

1,439,115

UNITED STATES PATENT OFFICE.

CIRO R. MENNILLO, OF LOS ANGELES, CALIFORNIA.

SECURING DEVICE FOR AUTOMOBILE SPARE WHEELS.

Application filed May 18, 1922. Serial No. 561,977.

*To all whom it may concern:*

Be it known that I, CIRO R. MENNILLO, a citizen of the United States, residing at Los Angeles, in the county of Los Angeles and State of California, have invented certain new and useful Improvements in Securing Devices for Automobile Spare Wheels, of which the following is a specification.

This invention relates to securing devices, and more particularly to means for securing spare wheels, on vehicles, but which is susceptible for other uses.

The primary object of the present invention is the provision of a novel locking means for association with the spindle of a spare wheel carrier for engaging the spare wheel for effectively preventing the withdrawal of the wheel from off of the carrier by unauthorized persons.

A further object of the invention is the provision of means for engaging the spare wheel carrier for effectively preventing the loosening of the parts of the spare wheel carrier so as to effectively prevent the rattling of the spare wheel and the parts of the carrier due to vibration of the vehicle or the accidental disengagement of said carrier parts through vibration.

A further object of the invention is the provision of a novel spare wheel carrier for motor vehicles embodying a spindle for receiving the spare wheel having a rack face, and a novel lock slidably mounted upon the spindle for engaging the carrier or wheel for preventing removal of parts of the carrier or wheel and having means for locking engagement with the rack face of the spindle.

A further object of the invention is the provision of a novel lock slidably associated with the spindle of a spare wheel carrier, having threadably associated therewith a winged nut member for tightly engaging the wheel to prevent rattling thereof on the carrier.

A still further object of the invention is to provide an improved device of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawing, forming a part of this specification, in which drawings:

Figure 1 is a longitudinal section through a spare wheel carrier with the improved securing device or lock associated therewith, the carrier having a spare wheel thereon also shown in section.

Figure 2 is an enlarged transverse sectional view through the carrier and securing device, taken on the line 2—2 of Figure 1.

Figure 3 is an end elevation of the winged nut and securing device removed from the spare wheel carrier.

Referring to the drawings in detail, wherein similar reference characters designate corresponding parts throughout the several views, the letter A generally indicates the spare wheel carrier; B, a spare wheel thereon; and C, the novel securing and locking device associated with the carrier.

The spare wheel carrier A comprises a spindle or shank 5, which can be secured in any preferred manner, as at 6 to a support 7. This support can form an integral part of a motor vehicle, such as the rear wall of the body thereof or may consist of a strap, which can be riveted or otherwise secured to the vehicle body. The shank or spindle 5 has secured thereto adjacent to its inner end a disc 8; upon which is adapted to seat the inner part of the hub 9 of the spare wheel B. The hub 9 is also adapted to be engaged and supported by a part of the securing means C which will be hereinafter more fully described. The shank or spindle 5 protrudes rearwardly from the support 7, and is rectangular shaped in cross section, and has one longitudinal edge thereof provided with a rack 10 which cooperates with the securing means C. The side faces of the spindle or shank 5 are provided with grooved guide ways 11, the purpose of which will be hereinafter more fully described.

The spare wheel B is of any preferred character and forms no part of the present invention, but has been simply shown to illustrate the use of the invention. The wheel B, as shown, is of the wire type, and consists of the hub 9, the rim 12 on which the tire 13 is adapted to fit and the connecting wire spokes 14.

The improved securing device C comprises an externally threaded plug or cylindrical body 15, which is provided with an axial way 16 of rectangular configuration for receiving the spindle or shank 5 of the spare wheel carrier A. This cylindrical body or plug 15 has threaded thereon, a relatively large winged nut 17, preferably of an ornamental type, and this nut is provided with an inwardly extending annular flange 18 terminating in an inclined or tapered seat 19. The flange 18 with its inclined or tapered seat 19 is adapted to be threaded into tight engagement with the hub 9, as clearly shown in Figure 1 of the drawings. The opposite ends of the plug or cylindrical body 15 can be provided with annular limiting flanges 20 and 21 for limiting the movement of the winged nut 17, and if so desired, one of the flanges, preferably the flange 20 can be made removable from the plug or cylindrical body 15. As shown, the nut 17 is provided with oppositely extending relatively long operating handles 22. The outer end of the body or plug 15 has welded or otherwise secured thereto a casing 25, which is shaped to conform to the transverse configuration of the spindle or shank 5. If so desired, both the plug or body 15 and the inner surface of the casing 25 can be provided with guide ribs 26 for engaging in the guide grooves 11 formed in the opposite side faces of the shank or spindle 5 as hereinbefore described. One end wall of the lock casing 25 can have riveted thereto a relatively strong leaf spring 27, which constitutes a resilient pawl for engaging the teeth of the rack 10 formed on one edge of the face 5. It is obvious that when the casing 25 and the plug or body 15 is slid upon the shank or spindle 5, that the resilient pawl 27 can engage the rack 10 and prevent the withdrawal of the said casing and plug from off of the spindle.

In order to provide means for actuating the pawl 27, a lock D has been provided, which will be now described.

If so desired, the outer end wall of the casing 25 can be provided with bent in tongues 28 above the rack 10, in order to prevent the forcing of instruments into the casing to actuate the pawl 27.

The lock D can be of any preferred construction provided the same can bring about the actuation of the resilient pawl 27 by the turning of a key, and as shown, this lock is of the cylinder or Yale type. In order to accommodate the lock D, the casing 25 is provided with a laterally extending sleeve or housing 30, in which the cylinder 31 of the lock D is secured in any preferred manner. The cylinder 31 rotatably receives in the usual manner, the operating plug 32 of the lock, which supports a plurality of pin tumblers 33. These pin tumblers 33 are engaged in the ordinary manner by their complement spring pressed drivers 34, which are carried by the cylinder 31. The plug 32 is provided with a key way 35 for the reception of a key 36 and it can be seen that when the correct key is inserted in the key way for actuating the pin tumblers 33, the plug 32 can be rotated. The inner end of the plug 32 has secured thereto in any preferred manner a cam 38, which is disposed within the casing 25, in the path of the resilient dog or pawl 27. By inserting the key 36 in the plug 32, and turning the same, it can be seen that the cam 38 will be forced into engagement with the pawl 27, which will raise the same from out of engagement with the rack 10, thus permitting free unimpeded movement of the housing 25 and the plug or body 15 from off of its spindle or shank 5.

In use of the improved device, the wheel B is placed upon the carrier A in the ordinary manner, after which the plug or body 15 and the housing 25 is slid on the shank or spindle 5, until the flange 18 and seat 19 firmly engage the inner surface of the hub 9 of the wheel B. The resilient pawl 27 will of course, engage the teeth of the rack 10 and prevent the rearward withdrawal of the casing and plug or body 15 from off of the shank or spindle 5. The winged or handled nut 17 can then be turned into tighter engagement with the hub of the wheel to prevent rattling thereof if so desired.

When it is desired to move the wheel B from the carrier, it is merely necessary to insert the proper key in the plug 32, and rotate the plug so as to actuate the cam 38 for lifting the pawl 27 which will permit the withdrawal of the housing and body 15 from off of the spindle or shank 5 as heretofore described.

From the foregoing description, it can be seen that a spare wheel lock has been provided of exceptionally simple and durable construction, which will absolutely preclude the withdrawal of the wheel from off of the carrier by unauthorized persons and effectively prevent the rattling and the loss of the wheel caused by vibration of the carrier during movement of the vehicle with which the same is associated.

Changes in details may be made without departing from the spirit or scope of this invention; but, I claim:

1. The combination with a spare wheel carrier including a spindle for supporting the wheel, of means slidably associated with the spindle for engaging the wheel, and a locking device carried by said means for locking engagement with the spindle.

2. The combination with a spare wheel carrier including a spindle for supporting a spare wheel, a body slidably associated with the spindle, locking means carried by the body for locking engagement with the spindle, and a nut threaded upon said body for movement toward and away from the spare wheel.

3. The combination with a spare wheel carrier for automobiles including a spindle, a disc carried by the spindle for engaging one end of the hub of the spare wheel, of a body slidably associated with the spindle, a key operated lock carried by the body for locking engagement with the spindle to prevent movement of the body in one direction on said spindle, and a winged nut threaded on said body for movement toward and away from the hub of the spare wheel and for engagement with the end of the hub of the spare wheel opposite to the end engaged by said disc.

4. The combination with a spare wheel carrier including a spindle provided with rack teeth for supporting a spare wheel, of a device slidably associated with the spindle for engaging the wheel to prevent movement thereof in one direction comprising a housing, a locking pawl carried by the housing for engaging the rack, and means for actuating the pawl.

5. The combination with a spare wheel carrier including a spindle having a rack member formed thereon, a wheel upon said spindle, a housing slidably associated with the spindle, a resilient pawl for engaging the rack, a cam rotatably carried by the housing disposed in the path of the pawl for moving the same out of engagement with the rack teeth, and key operated means for turning said pawl.

6. The combination with a spare wheel carrier including a spindle having a rack face, a seat formed on the spindle for a spare tire, of a lock for the spare tire including a body having an axial way formed therein for slidably receiving the spindle, a nut threaded upon said body for engaging the spare wheel, limiting shoulders formed on the ends of the body, a housing carried by the body, a spring pawl disposed in the housing for engaging the rack, a laterally extending casing formed on the housing, a cylinder lock carried by the housing including a plug, a cam carried by the plug and disposed in the path of the resilient pawl.

7. As a new article of manufacture, a wheel carrier comprising a spindle and a stop plate carried by one end of the spindle, a quick adjustable body slidably associated with said spindle for movement toward and away from the stop plate, a second member capable of fine adjustment toward and away from the stop plate associated with the body, and means carried by said body for preventing unauthorized movement of the body on said spindle away from said stop plate.

CIRO R. MENNILLO.